Sept. 11, 1962　　　N. R. BANCROFT　　　3,054,006
INDUCTION COUPLING DEVICES
Filed July 9, 1959　　　　　　　　　2 Sheets-Sheet 1

Inventor
*N. R. Bancroft*
By
*Holcomb, Wetherill & ...*
　　　　　　　　Attorney

Sept. 11, 1962   N. R. BANCROFT   3,054,006
INDUCTION COUPLING DEVICES
Filed July 9, 1959   2 Sheets-Sheet 2
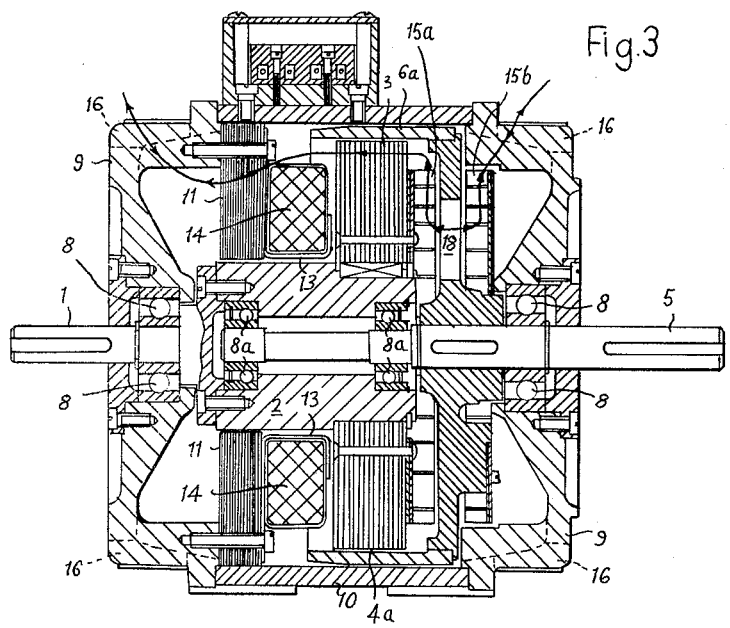
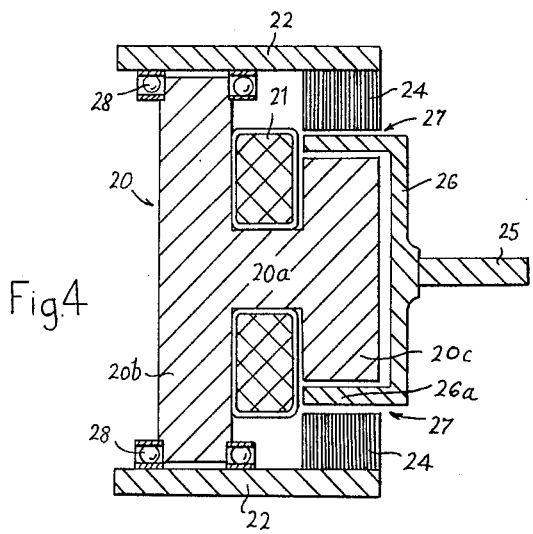
Inventor
*N. R. Bancroft*
By
*Attorney*

3,054,006
INDUCTION COUPLING DEVICES
Norman R. Bancroft, Cambridge, England, assignor to Pye Limited, Cambridge, England, a British company
Filed July 9, 1959, Ser. No. 826,028
Claims priority, application Great Britain July 15, 1958
11 Claims. (Cl. 310—92)

The present invention relates to magnetic induction coupling devices particularly for transmitting torque from a driving shaft to a driven shaft or for acting as an induction brake on a driven shaft.

In reactive induction couplings, the induction flux in the stator opposes the main field and reduces its effective value, it also injects a reactive component into the cage circuit to give a torque/speed characteristic such that for almost any value of load torque there are two possible values of slip. The speed of such couplings for any torque therefore depends upon the conditions existing prior to application of the new torque. Such a coupling is inherently unstable. To reduce the reactive stator currents, eddy current couplings are known in which a large number of poles ensure a high frequency of alternation of the field strength, which reduces the leakage coupling between stator and cage. Eddy current losses become high and the effective value of flux very low. To improve the performance and reduce flux distortion the rotor poles are tapered to provide heavy flux concentration in the gap and the cage must therefore be of magnetic material or must be kept very thin, and work within a narrow gap between rotor and stator. Such devices are still unstable over a large part of their torque range. A steel cage has been used to achieve stability, but demands very close machining limits, very accurate dynamic balancing and only achieves a low efficiency.

It is an object of the present invention to provide an induction coupling device which is simple and cheap to produce and which possesses an improved efficiency than has hitherto been obtained with such devices.

According to one aspect, the present invention consists in a magnetic induction coupling device comprising a rotor of magnetic material having a plurality of pole pieces projecting towards a stator, said stator being made of magnetic material and arranged coaxial with but spaced from said rotor so as to define with said rotor a substantially annular air gap between the projecting pole pieces and said stator, a rotatable cage member of electrically conductive non-magnetic material coaxial with said rotor and stator and having a generally cylindrical portion located in the air gap, and means for producing a toroidal magnetic field of which the axis lies along the axis of rotation of the rotor and which passes through the rotor and the stator and across the air gap and once through the cage member and which confers the same polarity on all the rotor pole pieces. The rotor pole pieces thereby form areas of magnetic flux of varying intensity around the air gap between the rotor and the stator which upon rotation of the rotor or the cage member induce currents in the cage member, the flux lines being substantially normal to the axially extending surface of the cage member and only passing once through said cage member, so that the other of said rotor and said cage member is caused to rotate by the interaction of the primary toroidal magnetic field and the magnetic field produced due to the electrical currents induced in the cage member.

An induction coupling device according to this invention may be constructed either with an annular rotor surrounding the stator and provided with inwardly projecting pole pieces, or with an annular stator surrounding a rotor provided with outwardly projecting pole pieces.

The toroidal magnetic field may be produced electrically by means of one or more excitation coils which can be fed by either a D.C. or an A.C. excitation current. Alternatively the toroidal magnetic field may be produced by means of one or more permanent magnet members. Where an electrical excitation current is employed, the magnetic field can be made variable, for example where it is desired to vary the speed or torque of the coupling. A variation of the strength of the magnetic field can also be achieved where one or more permanent magnet members are employed, either by the adjustment of two or more magnets with respect to each other or by arranging an adjustable shunt or an adjustable air gap in association with the magnet or magnets.

The rotor preferably consists of a generally cylindrical iron member having an axial length greater than the axial length of the pole pieces which project radially adjacent one end. The pole pieces may be formed of a stack of iron laminations and preferably comprise radially extending fingers which flare outwardly in a circumferential direction towards their tips, so that the circumferential extent of the tips is greater than that of the remaining portion of the pole pieces. Where the machine consists of a rotor surrounded by a cylindrical stator, the rotor may consist of a generally cylindrical iron core having laminated iron core pieces secured at one end of the core.

The cage of electrically conductive non-magnetic material preferably is made from copper, aluminium or an alloy of copper or aluminium, but can be made of non-ferrous metals.

The stator preferably consists of a cylindrical member of magnetic iron or it may be laminated. In embodiments where the stator surrounds the rotor it may consist of a stack of concentric laminations each of which extends axially of the machine.

The rotor and the cage member may be rotatably mounted by mounting them each on a separate shaft; the shafts being coaxial and one serving as the input shaft to the coupling whilst the other serves as the output shaft.

From another aspect the invention provides a magnetic induction coupling device comprising a generally cylindrical axially extending rotor of magnetic material having a plurality of outwardly radially projecting pole pieces at one end, an annular stator of a magnetic material coaxial with and surrounding said rotor so as to define an annular air gap between the projecting pole pieces and said stator, a rotatable cage member of electrically conductive non-magnetic material coaxial with said rotor and stator and having a generally cylindrical portion located in the air gap, a member of magnetic material extending radially between the stator and the rotor and spaced axially from the pole pieces and means for producing a toroidal magnetic field of which the axis lies along the axis of rotation of the rotor and which passes through the rotor and the stator and across the air gap and once through the cage member and the member of magnetic material and which confers the same polarity on all the rotor pole pieces.

The member of magnetic material may be laminated and consist of a plurality of thin annular iron discs secured together, side by side, the central aperture serving to accommodate the end of the rotor opposite to that carrying the pole pieces.

In such a construction, the coupling may be contained between two end covers of non-magnetic material, one arranged at each end of the stator ring and which respectively carry bearings for shafts carrying the rotor and the cage member. Advantageously the member of magnetic material may be secured to a flange or rim on one of the end covers and the excitation winding, which is of annular form, may be supported from the member of magnetic material between it and the pole pieces by means of clips.

In order to assist in cooling the coupling, one or more fans may be provided which draw air into the coupling through openings in the end covers. Where a single fan is employed it may be attached to the rotor or the cage member, whichever is the driving member. If both members are intended to be driven, each may be fitted with a fan, the fans being mutually assisting.

In an alternative cooling arrangement two substantially similar fans are provided within the casing of the coupling, one being adapted to rotate with the input member of the coupling and the other being adapted to rotate with the output member of the coupling, said fans being arranged respectively to draw air through the casing of the coupling in opposite directions for the same direction of rotation of said input member and said output member. With such an arrangement the volume of cooling air actually drawn through the coupling depends on the difference in the speed of rotation between the input member and the output member.

Preferably the fans are arranged adjacent to and facing each other and comprise similar centrifugal fans. Thus one of the fans may be carried by the projecting pole pieces and the other fan carried by the cage member.

In order that the invention may be more fully understood reference will now be made to the accompanying drawing in which:

FIGURE 3 is an axial section through an induction coupling device generally similar to FIGURE 1, but including a modified cooling arrangement, and FIGURE 4 is a diagrammatic axial section through a further embodiment of coupling device according to this invention.

Figure 1:
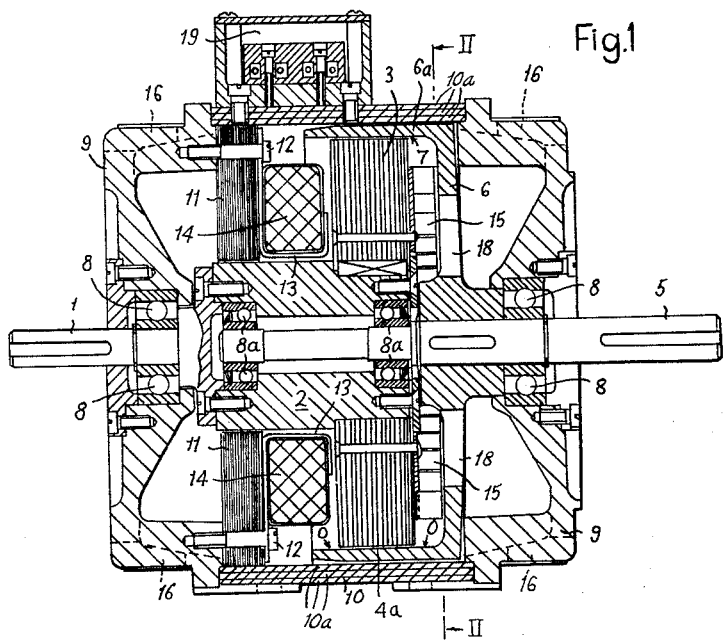
FIGURE 1 is an axial section through one construction of induction coupling device according to the invention.
Figure 2:
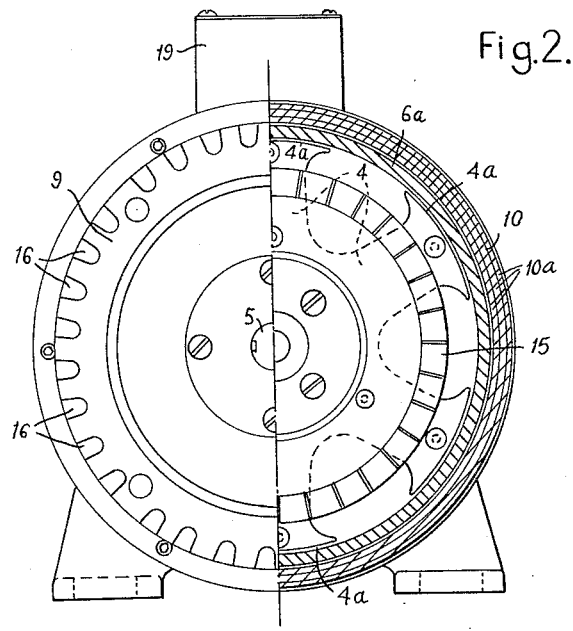
FIGURE 2 shows partly an end view and partly a section on the line II—II in FIGURE 1.

Referring to FIGURES 1 and 2, the coupling device comprises a shaft 1 which carries an axially extending generally cylindrical iron rotor core 2 on one end of which is mounted a stack of magnetic iron laminations 3, forming primary laminations, which are keyed to the rotor core 2 and rotate with it and the input shaft 1. These laminations are formed into poles 4 which are flared circumferentially outwards at their outer ends 4a. A second shaft 5 carries a cage unit 6 which is keyed thereto and rotates with the shaft. The outer wall 6a of the cage unit is relatively thick compared with known constructions of coupling device and of generally cylindrical form with a substantially uniform cross section and extends circumferentially around the pole pieces 4 but is spaced therefrom. The cage is preferably made of aluminium or copper, the former material having the advantage of a low inertia.

The shafts 1 and 5 are respectively carried by bearings 8 in the end covers 9 which comprise aluminium castings and between which extends the stator ring 10 of magnetic iron surrounding the poles 4 and the cage 6. The stator ring consists of a stack of concentric laminations 10a each of which extends axially of the machine. The portion 6a of the cage thus lies in the annular air gap 7 between the pole pieces 4 and the stator ring 10. The end covers 9 and stator ring 10 together form the casing of the device. Additional bearings 8a are provided between the shaft 5 and the interior of the rotor 2. Between the stator ring 10 and the end of the core remote from the laminations 3, is arranged a magnetic member consisting of a stack of annular iron laminations 11 forming secondary laminations which are secured to the adjacent end cover 9 by means of screws 12. The rotor core 2 passes through the bore in these laminations.

Suspending from the secondary laminations 11 by means of clips 13 is an excitation coil 14 which is of annular form, extending around the rotor core 2 and which is wound so that its turns are concentric with the rotor core.

Cooling is obtained by placing a ventilating fan 15 in such a position on the rotor primary laminations 3 that cool air drawn from outside into the coupling through apertures 16 in the end covers 9, and through apertures 18 in the cage hub as well as in the secondary laminations, plays directly on the cage ring 6a carrying away the power which is converted to heat in the cage ring. A terminal box 19 mounted on the casing provides for connection of the supplies to the excitation coil 14.

The operation of the device will now be described.

When the excitation coil 14 is energised, from a source of electrical supply, which may be either A.C. or D.C., a magnetic field is set up around the coil such that the lines of force associated with it form a toroidal field whose axis lies along the two shafts 1 and 5.

The complete path of the magnetic field is along the rotor core 2, outwards through the primary laminations 3, across the air gap in which lies the cage 7, along the casing stator ring 10 and inwards through the secondary laminations 11. If the coil is energised in the reverse sense, the field will be reversed, but the action of the machine is unchanged.

Since the primary laminations are poled, when the shaft 1 is stationary and the coil 14 energised, the cage 6 is suspended in a unidirectional polar field. If the shaft 1 is rotated, the magnetic field existing in the air gap rotates with it, inducing currents in the cage in accordance with Faraday's law of electromagnetic induction.

Since the cage is composed of high conductivity material, large induced currents may circulate without generating an undue amount of heat and these currents flow axially along the cage above the pole faces 4a, round the cage outside the polar length and return axially along the cage between the poles and round the other cage end.

The induced cage currents in their turn set up magnetic fields which react with the main field to produce a torque in the cage which will drive it in the same direction of rotation as that of the main magnetic field and hence the shaft 5.

The speed of the output shaft 5 relative to that of the input shaft 1 for any load is determined by the degree of slip between the two which will give rise to cage induction currents of such a magnitude that sufficient torque will be generated in the cage to overcome the load torque on the output shaft. It is thus a function of the input shaft speed and the strength of the rotating magnetic field produced by coil 14.

When the excitation coil 14 is to be energised by alternating current, the rotor core 2, the stator ring 10 and the laminations 3 and 11 are preferably made of a higher resistivity iron alloy in order to reduce the losses. Where however the coil 14 is to be D.C. energised, the rotor core 2 may be of wrought iron and the primary laminations 3 may be of wrought iron or a cheap grade of rotor lamination.

The design of the poles 4 is such that the variation of flux density across the cage 6 is approximately sinusoidal, with substantially all the flux effective.

Where the device is to be employed as a variable speed coupling, the degree of coupling between the input and output shafts is controlled by the excitation of coil 14, which is normally effected by a simple rheostat. The speed control so obtained is stepless and infinitely variable from zero to approximately 95% of the input shaft speed assuming a full load on the output shaft.

Where the device is employed as an induction brake, the shaft 1 may be restrained and the load to be controlled is connected to shaft 5 and rotates the cage member 6. As the excitation of coil 14 is increased, a braking torque is generated in the cage member 6, the value of the torque being proportional to the excitation. Such a brake is infinitely variable in its effect by variation of the excitation applied to coil 14.

It will be understood that the input drive may be applied to either shaft of the coupling without an appreciable variation in its efficiency.

FIGURE 3 shows a modified embodiment of coupling device generally similar to that described with reference to FIGURES 1 and 2 but wherein, in order to effect cooling of the coupling, two similar centrifugal fans 15a and 15b are provided, the fan 15a being carried by the rotor primary laminations 3 and the fan 15b being carried by the cage 6. Apertures 18 in the cage hub form an air connection between the two fans and the air flow through the coupling is indicated by the arrows.

The two fans are arranged so that they produce air streams in opposite directions through the coupling when the shafts 1 and 5 are rotating in the same direction. Thus the volume and direction of the resultant ventilating air stream drawn through the coupling depends upon the difference in the speed of rotation of the two fans 15a, 15b and which of the fans is rotating the faster.

The operation of this cooling arrangement will now be explained. As pointed out previously the coupling may be employed with either the shaft 1 or the shaft 5 acting as the input or driving shaft. When a full load torque is applied to one of the shafts and a prime mover is connected to the other shaft a speed difference will exist between the two shafts due to the slip of the coupling and thus the difference in speed of rotation of the two fans will enable air to be drawn through the coupling. The faster rotating fan attached to the shaft acting as the input shaft will then be able to draw sufficient air through the blades of the slower rotating fan, against the opposing air stream produced by this latter fan, to provide the required amount of air to cool the machine.

If the output shaft is run at a lower speed under full load torque conditions, the speed difference between the two fans will rise whereby the resultant air stream passing through the coupling also rises to provide additional cooling to remove the greater amount of power dissipated in the coupling as heat. Maximum cooling is achieved if the output shaft is locked against rotation and full excitation is applied to the coupling under which condition all of the power supplied by the input shaft will be dissipated as heat in the cage. In this case however one fan is acting alone and since there is no opposing air stream from the other fan, the volume of air drawn through the coupling by that one fan is the maximum possible and provides the necessary ventilation and cooling to reduce the temperature of the coupling.

It will be seen that the arrangement provides the required amount of cooling for full power at all speeds without wastefully using torque by supplying an excess amount of cooling at high speeds. In this way the overall efficiency of the coupling is improved.

FIGURE 4 is a diagrammatic axial section through a further embodiment of the induction coupling device according to the invention wherein the rotor 22 is arranged outside the stator 20. The stator consists of a generally cylindrical member of magnetic iron having a central portion 20a around which is positioned an annular excitation coil 21 and two end portions 20b and 20c of greater diameter than the central portion 20a, and the end portion 20b also being of greater diameter than the end portion 20c. The rotor 22 consists of a generally cylindrical iron member having laminated inwardly directed pole pieces 24 projecting towards the end portion 20c of the stator and defining an annular air gap 27 between the rotor and stator. The rotor is mounted for rotation on bearings 28 carried around the periphery of the end portion 20b of the stator. The cage 26 of electrically conductive non-magnetic material such as copper or aluminium has a cylindrical portion 26a positioned in the annular air gap 27 and is carried by and keyed to a rotatable shaft 25. The casing of the device is not shown since this may be constructed in any desired manner. The rotor 22 may be rotated by means of a belt drive engaging with its periphery, or alternatively can be formed with teeth on its periphery so that it can be driven by a gear wheel or by a chain engaging with these teeth. It will also be understood that the rotor can be carried from a rotatable shaft arranged coaxial with the shaft 25 if desired.

This embodiment of coupling device operates in a similar manner to the embodiment shown in FIGURES 1 and 2, the principal difference of the embodiment of FIGURE 4 being that the rotor and pole pieces are arranged outside the cage and the stator within the cage.

In couplings according to this invention, since the cage material is chosen primarily for its electrical conductivity, the efficiency of the coupling can be in excess of 80% under full load conditions at the maximum rated speed. Efficiency is here defined as the ratio between the power supplied to the input shaft and that available on the output shaft. Moreover since the cage member is non-magnetic, no large out-of-balance radial magnetic forces exist as are present in known electromagnetic coupling devices and which cause heavy wear on the bearings of the coupling. Thus coupling constructions according to this invention only require normal machining tolerances to be observed in their manufacture and only normal dynamic mechanical balancing is required.

In couplings according to the present invention the lines of flux from the excitation winding only cut the cage once and a low number of poles are used to reduce the frequency of alternation of the field strength. The speed at which a coupling is to be driven is a factor governing the choice of the number of poles in the coupling. In couplings for use at a speed of 1500 r.p.m. six poles may be used, whilst at lower speeds the number of poles may be increased. At 3000 r.p.m. four poles may be used and for couplings designed to run at over 6000 r.p.m. only two poles may be used, preferably with a cage of higher resistance to ensure stability. Thus the cage may be made of low resistivity copper in couplings designed to operate at lower speeds and may be made of aluminium alloy having a 50% higher resistivity in couplings designed to operate at higher speeds.

Moreover the polar span in couplings according to this invention is increased by flaring the outer end of the poles which are shaped to reduce the flux density in the polar gaps and also to keep the main flux leakage in the space between the poles at a minimum. The resulting drop in flux density necessitates a low cage resistance, and it is therefore desirable to use a thick wall cage. The thickness is limited only by the necessity to keep the main field distribution close to the poles and the excitation current is substantially independent of the total gap between the rotor and the stator over the range employed in the operation of the coupling.

Whilst particular embodiments have been described it will be understood that various modifications may be made without departing from the scope of this invention.

Thus the coupling device according to this invention may be constructed in the same casing as an electric motor or other prime mover which is to drive the input shaft. Alternatively the casing of the coupling may be so designed that it can readily be bolted to the casing of an electric motor with which it is to be used.

If desired, instead of forming the pole pieces from laminations, the pole pieces may be formed of solid wrought iron for D.C. applications. For A.C. applications use may be made of comminuted magnetic material bonded by a non-conducting binder.

Moreover instead of using a single energising coil, plural energising coils may be used which are energised so as to produce the desired magnetic field.

I claim:

1. An induction coupling device having a cooling arrangement comprising two substantially similar fans within the casing of the coupling, one of said fans being adapted to rotate with the input member of the coupling and the other fan being adapted to rotate with the output member of said coupling, said fans being arranged respectively to draw air through the casing of the coupling in opposite directions for the same direction of rotation of said input member and said output member whereby the volume of cooling air actually drawn through the coupling depends on the difference in the speed of rotation between the input member and the output member.

2. A magnetic induction coupling device comprising a generally cylindrical axially extending rotor of magnetic material having a plurality of outwardly radially projecting pole pieces at one end, an annular stator of magnetic material coaxial with and surrounding said rotor so as to define an annular air gap between the projecting pole pieces and said stator, the portion of said stator opposite said rotor being free from projecting pole pieces, a rotatable cage member of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor and means fixed relative to said stator for producing a toroidal magnetic field of which the axis lies along the axis of rotation of the rotor and which passes in the axial direction along the rotor and the stator, radially through the pole pieces and across the air gap containing the cage member and radially through the member of magnetic material and which thereby confers the same polarity on all the rotor pole pieces, whereby the magnetic field passes only once through the rotatable cage member in the annular gap and normal thereto, so that the generation of unwanted eddy currents in the rotatable cage member which introduces losses reducing the efficiency of the coupling is reduced or substantially avoided.

3. An induction coupling as claimed in claim 2, in which the pole pieces comprise radially extending fingers which flare outwardly in a circumferential direction towards their tips so that the circumferential extent of the tips is greater than that of the remaining portion of the pole pieces.

4. An induction coupling as claimed in claim 2, in which the stator consists of a stack of concentric laminations each of which extends axially of the machine.

5. A magnetic induction coupling device comprising a generally cylindrical axially extending rotor of magnetic material having a plurality of outwardly radially projecting pole pieces at one end, an annular stator of magnetic material coaxial with and surrounding said rotor so as to define an annular air gap between the projecting pole pieces and said stator, the portion of said stator opposite said rotor being free from projecting pole pieces, a rotatable cage member of electrically conductive nonmagnetic material coaxial with said rotor and stator and having a generally cylindrical portion located in the air gap, a member of magnetic material extending radially between the stator and the rotor and spaced axially from the pole pieces and including a gap to permit rotation of the rotor and an excitation coil fixed relative to said stator for producing a toroidal magnetic field of which the axis lies along the axis of rotation of the rotor and which passes in the axial direction along the rotor and the stator, radially through the pole pieces and across the air gap containing the cage member and radially through the member of magnetic material and which thereby confers the same polarity on all the rotor pole pieces, whereby the magnetic field passes only once through the rotatable cage member in the annular gap and normal thereto, so that the generation of unwanted eddy currents in the rotatable cage member which introduces losses reducing the efficiency of the coupling is reduced or substantially avoided.

6. A magnetic induction coupling device comprising a generally cylindrical axially extending rotor of magnetic material having a plurality of outwardly radially projecting pole pieces at one end, said pole pieces comprising a stack of iron laminations, an annular stator of laminated magnetic material coaxial with and surrounding said rotor so as to define an annular air gap between the projecting pole pieces and said stator, the portion of said stator opposite said rotor being free from projecting pole pieces, a rotatable member of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor and means fixed relative to said stator for producing a toroidal magnetic field of which the axis lies along the axis of rotation of the rotor and which passes in the axial direction along the rotor and the stator, radially through the pole pieces and across the air gap containing the rotatable member and radially through the member of magnetic material and which thereby confers the same polarity on all the rotor pole pieces, whereby the magnetic field passes only once through the rotatable member in the annular gap and normal thereto, so that the generation of unwanted eddy currents in the rotatable member which introduces losses reducing the efficiency of the coupling is reduced or substantially avoided.

7. A magnetic induction coupling device comprising a generally cylindrical axially extending rotor of magnetic material having a plurality of outwardly radially projecting pole pieces at one end, said pole pieces flaring outwardly in a circumferential direction towards their tips, an annular stator of concentric laminated magnetic material coaxial with and surrounding said rotor so as to define an annular air gap between the projecting pole pieces and said stator, said stator being free from projecting pole pieces, a rotatable member of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor and means fixed relative to said stator for producing a toroidal magnetic field of which the axis lies along the axis of rotation of the rotor and which passes in the axial direction along the rotor and the stator, radially through the pole pieces and across the air gap containing the rotatable member and radially through the member of magnetic material and which thereby confers the same polarity on all the rotor pole pieces.

8. A magnetic induction coupling device comprising a generally cylindrical axially extending rotor of magnetic material having a plurality of outwardly radially projecting pole pieces at one end, an annular stator comprising a series of concentric axially extending laminations of magnetic material coaxial with and surrounding said rotor so as to define an annular air gap between the projecting pole pieces and said stator, said stator being free from projecting pole pieces, a rotatable member made entirely of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor, means fixed relative to said stator for producing a toroidal magnetic field of which the axis lies along the axis of rotation of the rotor and which passes in the axial direction along the rotor and the stator, radially through the pole pieces and across the air gap containing the rotatable member and radially through the member of magnetic material and which thereby confers the same polarity on all the rotor pole pieces, whereby the magnetic field passes only once through the rotatable member in the annular gap and normal thereto, so that the generation of unwanted eddy currents in the rotatable member which introduces losses reducing the efficiency of the coupling is reduced or substantially avoided.

9. A magnetic induction coupling device comprising a generally cylindrical axially extending rotor of magnetic material having a plurality of outwardly radially projecting laminated iron pole pieces at one end, an annular stator of concentric laminated magnetic material coaxial with and surrounding said rotor so as to define an annular air gap between the projecting pole pieces and said stator, said stator being free from projecting pole pieces, a rotatable cage member of electrically conductive non-magnetic material coaxial with said rotor and stator and having a generally cylindrical portion located in the air gap, a laminated member of magnetic material extending radially between the stator and the rotor and spaced axially from the pole pieces and including a gap to permit rotation of the rotor, and an excitation coil fixed relative to said stator for producing a toroidal magnetic field of which the axis lies along the axis of rotation of the rotor and which passes in the axial direction along the rotor and the stator, radially through the pole pieces and across the air gap containing the cage member and radially through the member of magnetic material and which thereby confers the same polarity on all the rotor pole pieces, whereby the magnetic field passes only once through the rotatable cage member in the annular gap and normal thereto, so that the generation of unwanted eddy currents in the rotatable cage member which introduces looses reducing the efficiency of the coupling is reduced or substantially avoided.

10. A magnetic induction coupling device comprising an axially extending rotor of magnetic material, a stator of magnetic material coaxial with said rotor, a plurality of pole pieces carried by said rotor and projecting towards said stator, the space between the tips of said pole pieces and said stator defining an annular air gap and the portion of said stator opposite said rotor being free from projecting pole pieces, a rotatable member of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor and means fixed relative to said stator for producing a toroidal magnetic field of which the axis lies along the axis of rotation of the rotor and which passes in the axial direction along the rotor and the stator, radially through the pole pieces and across the air gap containing the rotatable member and radially through the member of magnetic material and which thereby confers the same polarity on all the rotor pole pieces, whereby the magnetic field passes only once through the rotatable member in the annular gap and normal thereto, so that the generation of unwanted eddy currents in the rotatable member which introduces losses reducing the efficiency of the coupling is reduced or substantially avoided.

11. A magnetic induction coupling device comprising an axially extending rotor of magnetic material having a plurality of projecting pole pieces at one end, a stator of magnetic material coaxial with said rotor, the space between said pole pieces and said stator defining an annular air gap, the portion of said stator opposite said rotor being free from projecting pole pieces, a rotatable cage member of electrically conductive non-magnetic material coaxial with said rotor and stator and having a generally cylindrical portion located in the air gap, a member of magnetic material extending radially between the stator and the rotor and spaced axially from the pole pieces and including a gap to permit rotation of the rotor and an energising coil fixed relative to said stator for producing a toroidal magnetic field of which the axis lies along the axis of rotation of the rotor and which passes in the axial direction along the rotor and the stator, radially through the pole pieces and across the air gap containing the cage member and radially through the member of magnetic material and which thereby confers the same polarity on all the rotor pole pieces.

References Cited in the file of this patent

UNITED STATES PATENTS

| 2,264,268 | Arnold | Dec. 2, 1941 |
| 2,488,827 | Pensabene | Nov. 27, 1949 |
| 2,565,494 | Gilfillan | Aug. 28, 1951 |
| 2,908,834 | Munson | Oct. 13, 1959 |

FOREIGN PATENTS

| 489,049 | France | Aug. 20, 1918 |